(12) United States Patent
Tinker

(10) Patent No.: US 7,729,461 B2
(45) Date of Patent: Jun. 1, 2010

(54) SYSTEM AND METHOD OF SIGNAL PROCESSING

(75) Inventor: Darrell E. Tinker, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 830 days.

(21) Appl. No.: 11/644,523

(22) Filed: Dec. 22, 2006

(65) Prior Publication Data

US 2008/0152055 A1    Jun. 26, 2008

(51) Int. Cl.
*H04L 7/00* (2006.01)
(52) U.S. Cl. ............... 375/355; 375/371; 375/376; 341/61
(58) Field of Classification Search ........... 375/354, 375/355, 371, 376; 341/61, 88, 123, 142; 700/46, 73, 74
See application file for complete search history.

(56) References Cited

U.S. PATENT DOCUMENTS

| | | | |
|---|---|---|---|
| 4,625,126 A | 11/1986 | Tinker et al. | |
| 5,185,609 A | 2/1993 | DeBord | |
| 5,559,513 A | 9/1996 | Rothermel et al. | |
| 5,617,344 A | 4/1997 | Young et al. | |
| 5,634,116 A | 5/1997 | Singer | |
| 5,796,995 A | 8/1998 | Nasserbakht et al. | |
| 5,915,028 A | 6/1999 | Chahabadi | |
| 5,949,363 A | 9/1999 | Kosiak et al. | |
| 6,055,619 A | 4/2000 | North et al. | |
| 6,057,793 A | 5/2000 | Gong et al. | |
| 6,061,704 A * | 5/2000 | Ostman et al. | 708/313 |
| 6,175,269 B1 | 1/2001 | Gielis et al. | |
| 6,184,942 B1 | 2/2001 | Patel et al. | |
| 6,208,671 B1 | 3/2001 | Paulos et al. | |
| 6,211,924 B1 | 4/2001 | Patel et al. | |
| 6,310,653 B1 | 10/2001 | Malcolm, Jr. et al. | |
| 6,324,235 B1 * | 11/2001 | Savell et al. | 375/372 |
| 6,333,767 B1 | 12/2001 | Patel et al. | |
| 6,362,755 B1 | 3/2002 | Tinker | |
| 6,373,912 B1 | 4/2002 | Yu | |
| 6,480,233 B1 | 11/2002 | Limberg | |
| 6,512,555 B1 | 1/2003 | Patel et al. | |
| 6,523,147 B1 | 2/2003 | Kroeger et al. | |
| 6,526,101 B1 | 2/2003 | Patel et al. | |
| 6,584,145 B1 | 6/2003 | Camagna et al. | |
| 6,584,162 B1 | 6/2003 | Tinker | |
| 6,694,026 B1 | 2/2004 | Green | |
| RE38,456 E | 3/2004 | Patel et al. | |
| 6,700,936 B1 | 3/2004 | Moss | |
| 6,701,140 B1 | 3/2004 | Stine | |
| 6,738,610 B1 | 5/2004 | Wildhagen | |
| 6,778,106 B2 | 8/2004 | Lenez et al. | |
| 6,801,028 B2 | 10/2004 | Kernahan et al. | |
| 7,061,409 B1 * | 6/2006 | Jantti et al. | 341/61 |
| 7,071,773 B2 | 7/2006 | Patel et al. | |
| 7,079,657 B2 | 7/2006 | Wu et al. | |
| 7,106,224 B2 | 9/2006 | Knapp et al. | |
| 7,180,349 B2 | 2/2007 | Leifso et al. | |

(Continued)

*Primary Examiner*—Dac V Ha
(74) *Attorney, Agent, or Firm*—Toler Law Group

(57) ABSTRACT

An audio processor is disclosed and includes a sample rate converter and a digital phase-locked-loop module in communication with the sample rate converter. The sample rate converter includes a plurality of digital filters, and the digital phase locked loop module includes a phase accumulator having an initialization value determined based at least partially on a filter sequence address associated with the plurality of filters.

26 Claims, 5 Drawing Sheets

U.S. PATENT DOCUMENTS

| | | |
|---|---|---|
| 2001/0040930 A1 | 11/2001 | Abbey |
| 2003/0161477 A1 | 8/2003 | Wu et al. |
| 2004/0032922 A1 | 2/2004 | Knapp et al. |
| 2004/0075766 A1 | 4/2004 | Schoner |
| 2004/0264614 A1 | 12/2004 | Tinker |
| 2006/0077300 A1 | 4/2006 | Cheon et al. |
| 2006/0179095 A1 | 8/2006 | Lo Muzio et al. |
| 2007/0046508 A1* | 3/2007 | Nishikawa ............. 341/61 |
| 2007/0080834 A1* | 4/2007 | Auld et al. ............. 341/61 |

* cited by examiner

| Filter Sequence Value | Filter Stage 3 | Filter Stage 2 | Filter Stage 1 |
|---|---|---|---|
| 0 | Filter 3 left<br>Filter 3 right | | |
| 1 | | | Filter 1 right |
| 2 | Filter 3 left<br>Filter 3 right | | |
| 3 | | Filter 2 left<br>Filter 2 right | |
| 4 | Filter 3 left<br>Filter 3 right | | |
| 5 | | | Filter 1 left |
| 6 | Filter 3 left<br>Filter 3 right | | |
| 7 | | Filter 2 left<br>Filter 2 right | |
| 8 | Filter 3 left<br>Filter 3 right | | |
| 9 | | | Filter 1 right |
| 10 | Filter 3 left<br>Filter 3 right | | |
| 11 | | Filter 2 left<br>Filter 2 right | |
| 12 | Filter 3 left<br>Filter 3 right | | |
| 13 | | | Filter 1 left |
| 14 | Filter 3 left<br>Filter 3 right | | |
| 15 | | Filter 2 left<br>Filter 2 right | |

FIG. 4

SYSTEM AND METHOD OF SIGNAL PROCESSING

FIELD OF THE DISCLOSURE

The present disclosure is generally related to signal processing.

BACKGROUND

A signal processing system that experiences a change from a first data source input to a second data source input may result in an undesirable discontinuity in an output signal. As an example, when an audio signal is switched from a first source to a second source, the user may hear an undesirable pop or clicking sound. Hence there is a need for an improved system and method of signal processing.

BRIEF DESCRIPTION OF THE DRAWINGS

FIG. 4 is a chart that illustrates Finite Impulse Response (FIR) filter sequence values.

DETAILED DESCRIPTION

In a particular embodiment, an audio processor is disclosed that includes a sample rate converter and a digital phase-locked-loop (DPLL) module in communication with the sample rate converter. The sample rate converter includes a plurality of digital filters, and the digital phase locked loop module includes a phase accumulator having an initialization value determined based at least partially on a filter sequence address associated with the plurality of digital filters.

In another embodiment, a system is disclosed that includes a first data source input, a second data source input, and a switch responsive to the first and second data source inputs. The system also includes a digital phase-locked-loop (DPLL) module including a phase accumulator and a sample rate converter (SRC) including a digital filter. The sample rate converter is responsive to SRC input data and responsive to the DPLL module. The phase accumulator is initialized with an initialized value based at least partially on a control value associated with the digital filter.

In another embodiment, a signal processing device is disclosed that includes a sample rate converter (SRC), a filter controller, and a digital phase locked loop (DPLL) module. The sample rate converter is adapted to receive an input signal and includes a plurality of interpolation filters and a fractional interpolator. The digital phase-locked loop (DPLL) module is configured to receive a system clock, a sample clock, a filter sequence address, and a source selection indicator. The digital phase-locked loop module is responsive to the filter controller and is configured to supply a rate control signal to the sample rate converter. The digital phase-locked loop module includes a phase accumulator having a phase accumulator initialization value determined based at least in part on the filter sequence address. The phase accumulator is configured to output a phase accumulator signal. The digital phase-locked loop module also includes a rate control module configured to input the phase accumulator signal, and to output the rate control signal.

In another embodiment, a method is disclosed that includes detecting a change in a data source from a first data source to a second data source. The method further includes determining a phase accumulator initialization value based on a filter sequence address of a filter receiving the data source as an input, wherein the filter sequence address includes a filter sequence value and a filter control sign bit. Additionally, the method includes initializing a phase accumulator of a digital phase locked loop (DPLL) module based on the phase accumulator initialization value and performing a sample rate conversion on data from the second data source using a sample rate value based on information received from the DPLL module.

Figure 1:
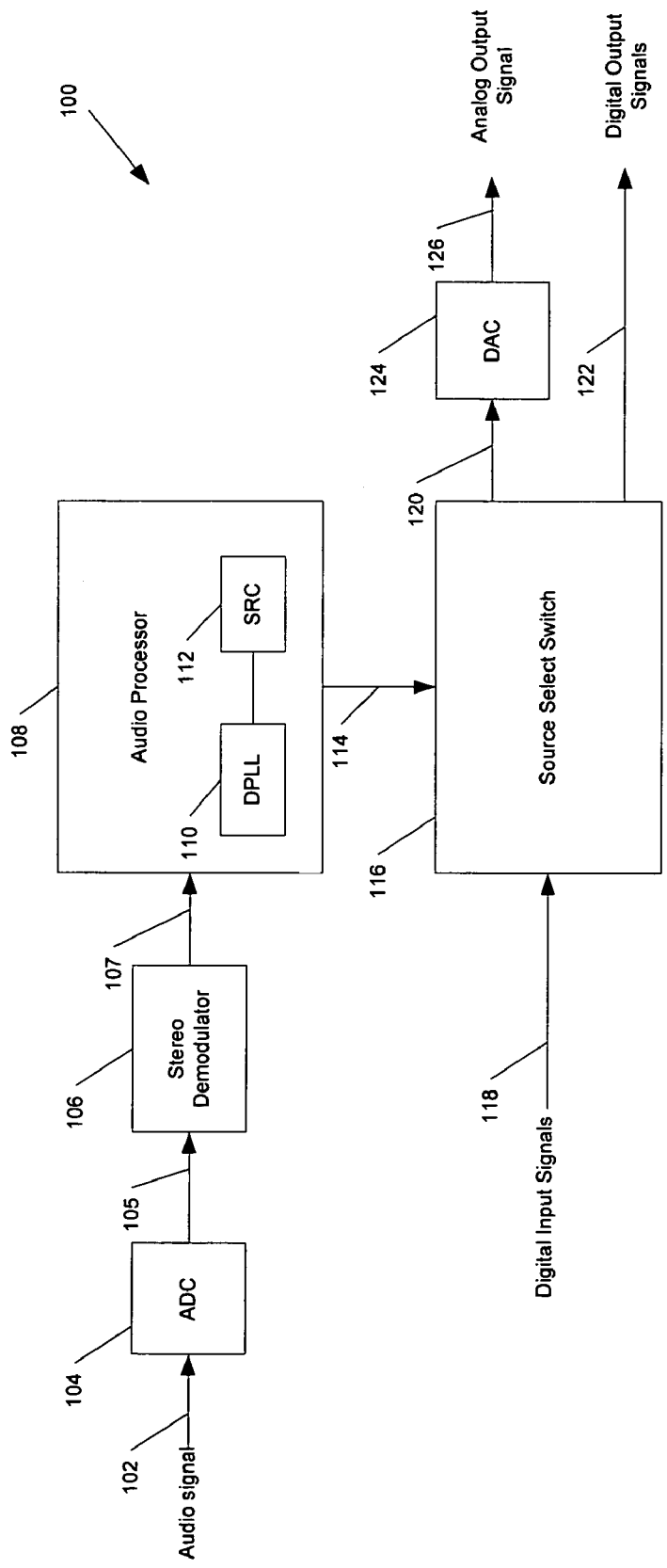
FIG. 1 is a block diagram of a particular embodiment of a signal processing system.

Referring to FIG. 1, a particular embodiment of a signal processing system is illustrated and generally designated 100. The system 100 includes a stereo demodulator 106 that is adapted to receive audio input signals, such as the analog audio input signal 102, via an analog-to-digital converter (ADC) 104. The stereo demodulator 106 provides a demodulated digital audio signal 107 to an audio processor 108 that outputs a processed signal 114. The audio processor 108 provides the processed signal 114 to a source select switch 116. In a particular embodiment, the source select switch 116 can also receive one or more digital input signals 118 from other sources. The source select switch 116 can output digital output signals 122 directly and can provide a switched audio signal 120 to the DAC converter 124 for conversion to an analog output signal 126.

In a particular illustrative embodiment, an analog audio input signal 102 may be received from a source at the A/D converter 104. The A/D converter 104 converts the analog audio input signal to a digital audio signal 105 and sends the digital audio signal 105 to the stereo demodulator 106. In an illustrative embodiment, the stereo demodulator can demodulate the digital audio signal 105, for example, by converting the frequency of the digital audio signal 105 to a frequency that the audio processor 108 can accept, and sends a demodulated signal 107 to the audio processor 108.

In a particular embodiment, the audio processor 108 can include a digital phase-locked loop module (DPLL) 110 that communicates with a sample rate converter (SRC) 112. The SRC 112 can include a plurality of digital filters that form a finite impulse response interpolation filter. For each sample of the demodulated digital audio signal 107, the SRC 112 executes a filter sequence and provides filtered samples at a system sample rate to the source select switch 116 via the processed signal 114. The DPLL 110 includes a phase accumulator having an initialization value that is determined based on a filter sequence address that includes a filter sequence value corresponding to a filter sequence state at a particular time. The filter sequence address can include, for example, contents of a state register of a filter control state machine associated with the plurality of digital filters of the SRC 112.

In a particular embodiment, a change in the demodulated digital audio signal 107, such as a change from a first demodulated signal to a second demodulated signal, may result in a change of signals received by the audio processor 108 and provided to the SRC 112. The phase and sample rate of the second demodulated signal may not be the same as the phase and sample rate of the first demodulated signal. Therefore the initialization value associated with the phase accumulator of the DPLL 110 may be altered in response to the change of demodulated signals provided to the SRC 112, for example, based on the filter sequence value sampled at a time with respect to a sample of the second demodulated signal. The DPLL module 110 can supply a control signal to the SRC 112, where the control signal is determined at least in part by the altered phase accumulator initialization value. In response to receiving the control signal from the DPLL 110, the SRC 112 can adjust an oversample rate, in order to reduce a phase error in the SRC 112 that may result from a change in the demodulated digital audio signal 107. The reduction in phase error can reduce or eliminate popping, clicking or other undesirable sounds resulting from a change of audio signals.

Figure 2:
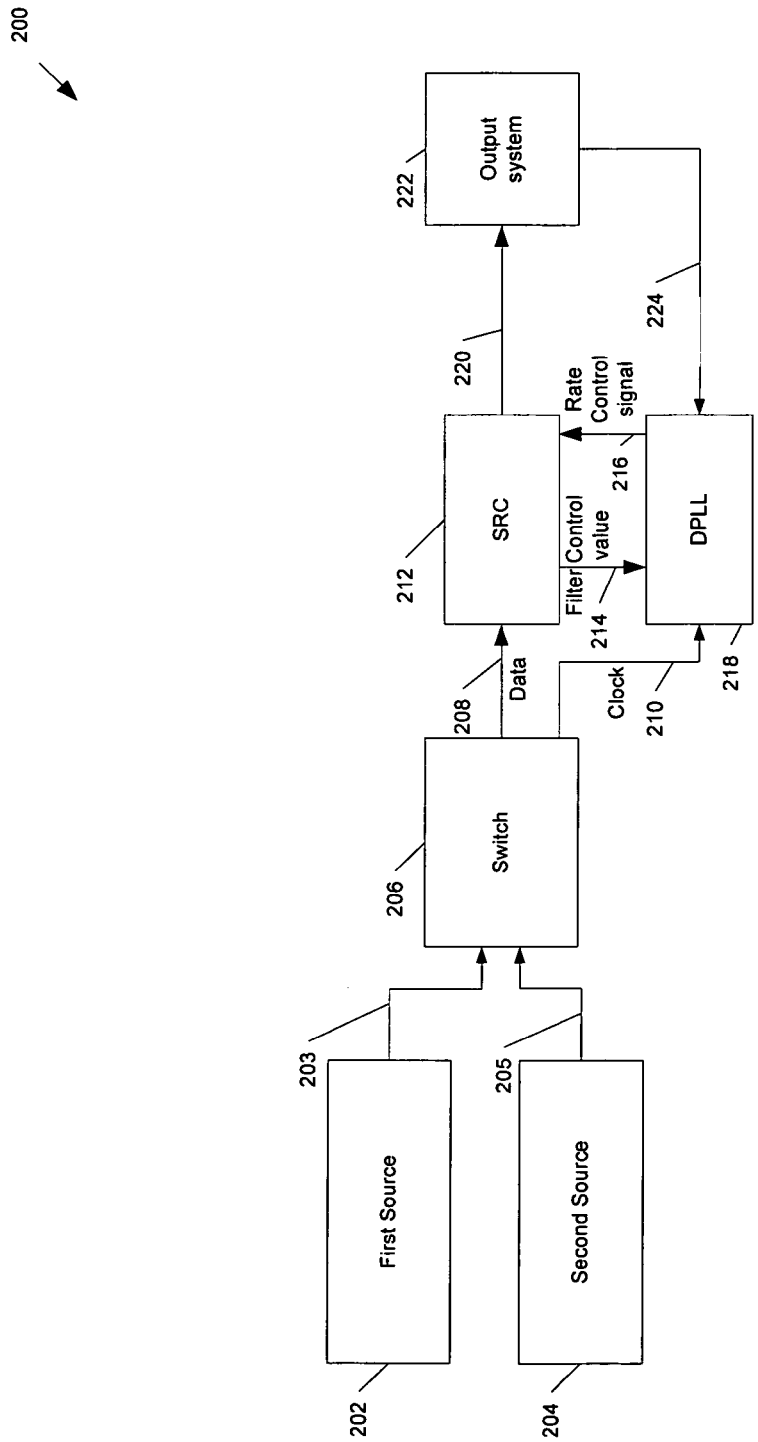
FIG. 2 is a block diagram of a second particular embodiment of a signal processing system.

Referring to FIG. 2, a second particular embodiment of a system to process an input signal is illustrated and generally designated 200. A first source 202 and a second source 204 can be coupled to a switch 206. In an illustrative embodiment, the first source 202 may be a source of a mono TV audio signal, and the second source 204 may be a source of a stereo TV audio signal. The switch 206 can be coupled to a sample rate converter (SRC) 212. The switch 206 can also be coupled to a digital phase-locked loop module (DPLL) 218 that includes a phase accumulator. The DPLL module 218 and the SRC 212 can each be coupled to the other and to an output system 222, such as a TV audio output device.

In a particular illustrative embodiment, the switch 206 can receive a first input signal 203 from the first source 202 and can provide data 208 corresponding to the first input signal 203 to the SRC 212. In addition, the switch can provide a sample clock 210 to the DPLL 218. In an illustrative embodiment, the DPLL module 218 can also receive a system clock 224 from the output system 222. Based at least partially on the sample clock 210 and the output system clock 224, the DPLL 218 can provide a rate control signal 216 to the SRC 212.

In a particular embodiment, the data 208 provided to the SRC can indicate a change in an input signal from the first source signal 203 to a second source signal 205 provided by the second source 204. The SRC 212 can produce the filter control value 214 based on an internal state of the SRC 212 evaluated at a time occurring subsequent to the change in the input signal from the first source signal 203 to the second input source signal 205, and can provide the filter control value 214 to the DPLL 218. The DPLL 218 can determine a new phase accumulator initialization value based on the filter control value 214 corresponding to the second source signal 205, and the DPLL 218 can send the rate control signal 216 to the SRC 212. In a particular embodiment, the SRC 212 can adjust an oversample rate of the data 208 with respect to the system clock 224 provided to the DPLL 218 by the output system 222. The adjustment of the oversample rate may result in a reduction of the phase error of the SRC 212, thereby reducing audio clicking or popping sounds that may be present in the audio output due to a signal source change.

Figure 3:
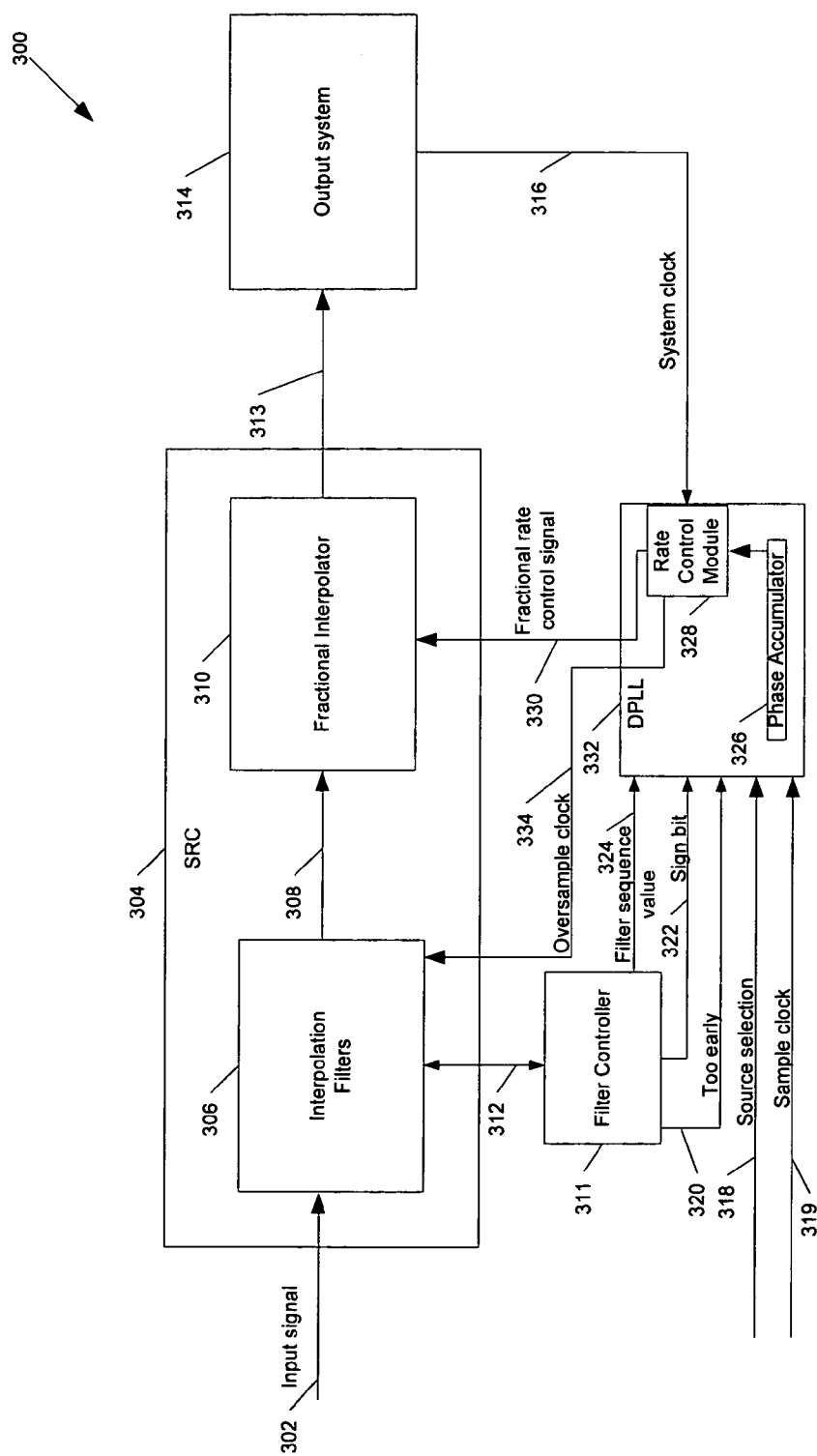
FIG. 3 is a block diagram of a particular embodiment of a signal processing device.

Referring to FIG. 3, a particular embodiment of a signal processing device is illustrated and generally designated 300. The signal processing device 300 includes a sample rate converter (SRC) 304 coupled to a filter controller 311 and a digital phase-locked loop (DPLL) module 332. The SRC 304 may include a plurality of interpolation filters 306 and a fractional interpolator 310. In an illustrative embodiment, the plurality of interpolation filters 306 may include a finite impulse response (FIR) filter. The DPLL module 332 may include a phase accumulator 326 and a rate control module 328. In a particular embodiment, the SRC 304 and the DPLL module 332 may be coupled to an output system 314, such as an audio output device, which provides a system clock 316 to the DPLL module 332. The fractional interpolator 310 may provide output samples 313 to the output system 314 at a system sample rate that is fixed with respect to the system clock 316.

In a particular embodiment, the SRC 304 receives an input signal 302. The plurality of interpolation filters 306 receive a filter control signal 312 from the filter controller 311, which corresponds to a predetermined filter sequence to be applied at least once to each sample of the input signal 302. The plurality of interpolation filters 306 provide filtered samples 308 to the fractional interpolator 310 at an oversample rate. The filter controller 311 also provides a filter sequence value 324, a filter control sign bit 322, and a too early signal 320 to the DPLL module 332. The DPLL module 332 determines a phase accumulator initialization value based at least in part on the filter sequence value 324. In an illustrative embodiment, the phase accumulator initialization value can be determined based at least partially on a filter sequence address that includes the filter sequence value 324 and the sign bit 322.

In an illustrative embodiment, a source selection indicator 318 and sample clock 319 may be provided to the DPLL module 332 by one or more other sources. Alternatively, the source selection indicator 318 and the sample clock 319 may be derived from the input signal 302. In a particular illustrative embodiment, the phase accumulator 326 may be adjusted in a predetermined sense at the oversample rate, and can be adjusted in a sense opposite to the predetermined sense at a subsequent time determined with respect to the sample clock 319.

In a particular illustrative embodiment, the rate control module 328 of the DPLL module 332 may generate an oversample clock 334 at the oversample rate, based at least in part on the phase accumulator initialization value. The oversample clock 334 can also be based on a rate control value (not shown), which represents a number of oversample clock cycles to be generated for each system clock cycle. In a particular illustrative embodiment, the rate control value can have an integer part and a fractional part. The rate control value can be controlled by the rate control module 328 to reduce a phase error, as measured by the phase accumulator 326.

The rate control module 328 of the DPLL module 332 can generate a fractional rate control signal 330, which can include a fractional part of the rate control value. In a particular illustrative embodiment, the fractional rate control signal 330 can also be based on a sample time determined with respect to the sample clock 319. The DPLL module 332 can provide the fractional rate control signal 330 to the fractional interpolator 310 of the SRC 304.

In a particular illustrative embodiment, a change in the input signal 302, such as a change from a first input signal to a second input signal, can be detected at the system 300. The filter controller 311 determines a filter sequence value 324 based on a signal received from the second input signal and sends the filter sequence value 324 to the DPLL module 332. Further, the filter controller 311 can send a filter control sign bit 322 and a too early signal 320 to the DPLL module 332. The DPLL module 332 can determine a phase accumulator initialization value based on the filter sequence value 324, the filter control sign bit 322, the too early signal 320, other data or signals, or any combination thereof.

In an illustrative embodiment, the phase accumulator initialization value may be determined based on the sign bit 322 concatenated with an inversion of the filter sequence value 324 to produce a 2's complement phase error value. The phase accumulator initialization value may be determined based on the 2's complement phase error value evaluated at a first time occurring subsequent to a change from a first input signal to a second input signal and the 2's complement phase error value evaluated at a next time subsequent to the change from the first input signal to the second input signal.

In a particular illustrative embodiment, the too early signal 320 can indicate that a phase error is too large because, for example, a first sample of the second input signal is received too soon after a last sample of the first input signal. The DPLL 332 can then wait for a subsequent sample of the second input signal before determining the filter sequence value 324 and the sign bit 322 to be used to determine the phase accumulator initialization value.

The DPLL module 332 can generate a rate control signal 330 and the oversample clock 334, based at least in part on the phase accumulator initialization value corresponding to the second input signal. The DPLL module 332 can perform an adjustment of the oversample rate and send the rate control signal 330 and the oversample clock 334 to the SRC 304. In a particular embodiment, the adjustment of the oversample rate may result in a reduction in a phase error of a sampled signal.

Referring to FIG. 4, an illustrative embodiment of a chart 400 illustrates Finite Impulse Response (FIR) filter sequence values. As illustrated, the chart 400 illustrates a plurality of filter sequence values 402 and a plurality of filter stages 404-408. Chart 400 represents a complete filter sequence, which may be executed approximately once for each sample input to an interpolation filter module. Each filter sequence value 402 corresponds to a filter sequence 410 for one or more of the filter stages. During operation, the filter sequence value 402 progresses through a sequence from 0 to 15 as the filter sequences 410 of each of the filter stages 404-408 are executed.

Figure 5:
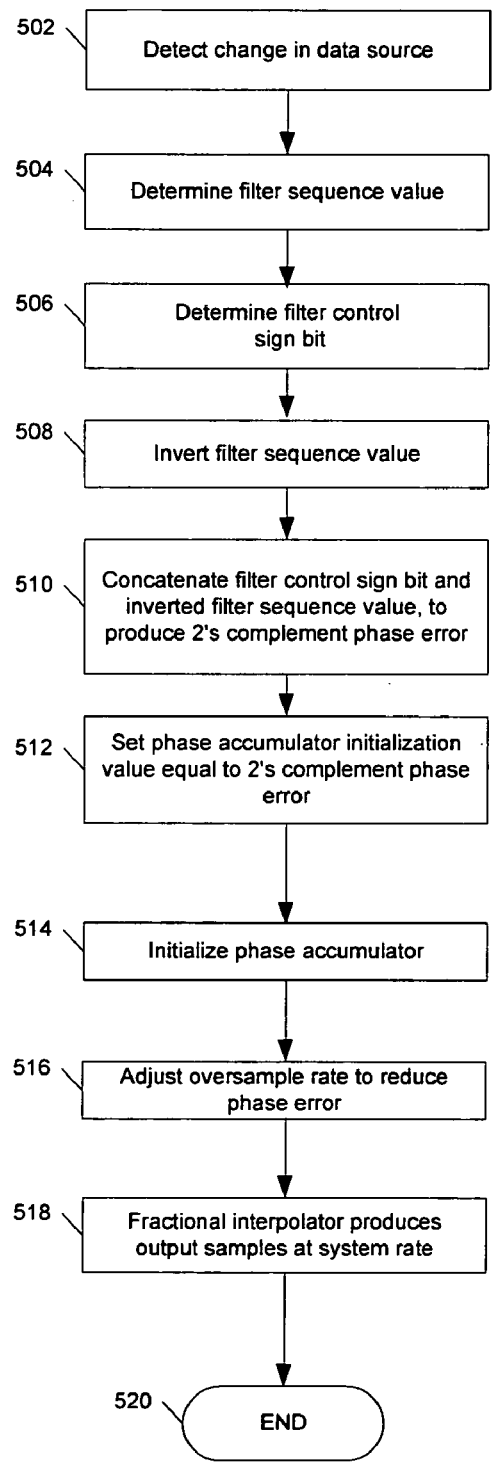
FIG. 5 is a flow chart of an embodiment of a signal processing method.

Referring to FIG. 5, a particular embodiment of a method of processing a signal is illustrated. At block 502, a change in a data source is detected. In an illustrative embodiment, a dedicated switch that receives an input command may detect the change in the data source. In another illustrative embodiment, a passive detection device may detect the change in the data source. In an illustrative embodiment, the data source may change from a first data source to a second data source, such as from a first TV audio source to a second TV audio source.

Proceeding to block 504, a filter sequence value is determined for a plurality of interpolation filters within a sample rate converter (SRC). In a particular illustrative embodiment, the plurality of interpolation filters may include a finite impulse response (FIR) filter. Continuing to block 506, a filter control sign bit is determined. Proceeding to block 508, the filter sequence value is inverted, forming an inverted filter sequence value. Moving to block 510, the filter control sign bit is concatenated with the inverted filter sequence value, producing a 2's complement phase error.

Proceeding to block 512, a phase accumulator initialization value is set equal to the 2's complement phase error. Moving to block 514, a phase accumulator is initialized. In a particular embodiment, the phase accumulator of a digital phase-locked loop (DPLL) module is initialized based on the phase accumulator initialization value. At block 516, an oversample rate may be adjusted relative to a system rate within the sample rate converter, to reduce a phase error associated with the data from the second data source. The sample rate conversion on data from the second data source may use a sample rate value based on information received from the DPLL module. In a particular illustrative embodiment, the sample rate converter may receive a rate control signal from the DPLL module, the value of which may be based at least in part on an output of the phase accumulator. Moving to block 518, a fractional interpolator produces output samples at the system rate. The method terminates at 520.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An audio processor comprising:
   a sample rate converter including a plurality of digital filters; and
   a digital phase-locked-loop (DPLL) module in communication with the sample rate converter, the digital phase locked loop module including a phase accumulator, the phase accumulator having an initialization value determined based at least partially on a filter sequence address associated with the plurality of digital filters.

2. The audio processor of claim 1, wherein the initialization value is further determined at least partially in response to a change of input signals to the sample rate converter, from a first input signal to a second input signal.

3. The audio processor of claim 1, wherein the DPLL module is adapted to supply a control signal to the sample rate converter, the control signal determined at least in part by the initialization value.

4. The audio processor of claim 3, wherein the sample rate converter, in response to receiving the control signal, is adapted to adjust a sample rate.

5. The audio processor of claim 1, wherein the plurality of digital filters comprises a finite impulse response interpolation filter.

6. The audio processor of claim 1, wherein the filter sequence address comprises contents of a state register of a filter control state machine associated with the plurality of digital filters.

7. A system comprising:
a first data source input;
a second data source input;
a switch responsive to the first and second data source inputs;
a digital phase-locked-loop (DPLL) module including a phase accumulator; and
a sample rate converter (SRC) including a digital filter, the sample rate converter responsive to SRC input data and responsive to the DPLL module, wherein the phase accumulator is initialized with an initialized value based at least partially on a filter control value associated with the digital filter.

8. The system of claim 7, wherein the switch is operable to:
select either the first data source input or the second data source input as a switch output;
provide the switch output as a sample rate converter (SRC) input to the sample rate converter; and
change the switch output in response to a command.

9. The system of claim 8, wherein the DPLL, in response to the change in the switch output, is adapted to:
generate a rate control signal determined at least in part by the initialized value of the phase accumulator; and
send the rate control signal to the sample rate converter.

10. The system of claim 9, wherein the sample rate converter is adapted to receive the rate control signal, and, to perform an adjustment of an oversample rate in response to the rate control signal.

11. The system of claim 10, wherein the adjustment of the oversample rate results in a reduction in a phase error of a sampled signal.

12. The system of claim 11, wherein the adjustment of the oversample rate results in a minimization of the phase error.

13. A signal processing device comprising:
a sample rate converter adapted to receive an input signal, the sample rate converter comprising:
a plurality of interpolation filters, and
a fractional interpolator;
a filter controller; and
a digital phase-locked loop (DPLL) module configured to receive a system clock, a sample clock, a filter sequence address, and a source selection indicator, the digital phase-locked loop module responsive to the filter controller, the digital phase-locked loop module configured to supply a rate control signal to the sample rate converter, the digital phase-locked loop module comprising:
a phase accumulator having a phase accumulator initialization value determined based at least in part on the filter sequence address, the phase accumulator configured to output a phase accumulator value, and
a rate control module configured to input the phase accumulator value, the rate control module further configured to output the rate control signal.

14. The signal processing device of claim 13, wherein the plurality of interpolation filters are configured to execute a predetermined filter sequence at least once for each sample of the input signal.

15. The signal processing device of claim 13, wherein the fractional interpolator is configured to:
receive filtered samples from the plurality of interpolation filters; and
provide output samples at a system sample rate that is fixed with respect to the system clock.

16. The signal processing device of claim 13, wherein the plurality of interpolation filters are configured to provide filtered samples at an oversample rate.

17. The signal processing device of claim 13, further comprising a source select switch configured to:
select the input signal from a plurality of source signals; and
provide the input signal and the sample clock, the sample clock comprising an input sample rate.

18. The signal processing device of claim 13, wherein the rate control signal is based at least in part on the phase accumulator value sampled at a sample time determined with respect to the sample clock.

19. The signal processing device of claim 13, wherein:
the filter sequence address comprises a sign bit and a filter sequence value; and
the phase accumulator initialization value is determined based at least partially on the sign bit concatenated with an inversion of the filter sequence value, to produce a 2's complement phase error value.

20. The signal processing device of claim 19, wherein the phase accumulator initialization value is further determined based at least in part on the 2's complement phase error value evaluated at a first time, the first time occurring subsequent to a change from a first input signal to a second input signal.

21. The signal processing device of claim 19, wherein the filter sequence address further comprises a too-early signal, and wherein the phase accumulator initialization value is further determined based at least in part on the 2's complement phase error value evaluated at a next time, the next time following a first sample clock received subsequent to a change from a first input signal to a second input signal.

22. The signal processing device of claim 13, wherein the phase accumulator is configured to be adjusted in a predetermined sense at an oversample rate and to be adjusted in a sense opposite to the predetermined sense at a subsequent time determined with respect to the sample clock.

23. A method comprising:
detecting a change in a data source from a first data source to a second data source;
determining a phase accumulator initialization value based on a filter sequence address of a filter receiving the data source as an input, the filter sequence address comprising a filter sequence value and a filter control sign bit;
initializing a phase accumulator of a digital phase locked loop (DPLL) module based on the phase accumulator initialization value; and
performing a sample rate conversion on data from the second data source using a sample rate value based on information received from the DPLL module.

24. The method of claim 23, wherein determining the phase accumulator initialization value further comprises:

determining the filter sequence value;
determining the filter control sign bit;
inverting the filter sequence value, to produce an inverted filter sequence value;
concatenating the filter control sign bit and the inverted filter sequence value, to produce a 2's complement phase error; and
setting the phase accumulator initialization value equal to the 2's complement phase error.

25. The method of claim 23, wherein performing the sample rate conversion comprises:
adjusting an oversample rate relative to a system rate within a sample rate converter to reduce a phase error associated with the data from the second data source; and
using a fractional interpolator within the sample rate converter to produce output samples at the system rate.

26. The method of claim 25, wherein the sample rate converter receives a rate control signal from the DPLL module, and wherein the value of the rate control signal is based at least in part on an output of the phase accumulator.

* * * * *